(12) United States Patent
Verboom

(10) Patent No.: US 6,407,970 B2
(45) Date of Patent: Jun. 18, 2002

(54) ENHANCED ADAPTIVE AND SELECTIVE ISI CANCELLATION FOR A READ CHANNEL IN STORAGE TECHNOLOGIES

(75) Inventor: Johannes J. Verboom, Colorado Springs, CO (US)

(73) Assignee: Plasmon LMS, Inc., Colorado Springs, CO (US)

( * ) Notice: Subject to any disclaimer, the term of this patent is extended or adjusted under 35 U.S.C. 154(b) by 0 days.

(21) Appl. No.: 09/767,997

(22) Filed: Jan. 23, 2001

Related U.S. Application Data

(63) Continuation of application No. 09/561,485, filed on Apr. 28, 2000, now Pat. No. 6,205,103, which is a continuation-in-part of application No. 09/107,808, filed on Jun. 30, 1998, now Pat. No. 6,118,746.

(51) Int. Cl.$^7$ ................................................. G11B 5/09
(52) U.S. Cl. ................................. 369/59.17; 369/59.18; 369/53.31; 369/53.35; 369/124.15
(58) Field of Search ........................... 369/59.17, 59.18, 369/59.19, 59.2–59.24, 53.31, 53.33, 53.35, 124.05, 124.14, 124.15, 47.16, 47.18

(56) References Cited

U.S. PATENT DOCUMENTS

| | | |
|---|---|---|
| 4,646,281 A | 2/1987 | Verboom |
| 4,700,241 A | 10/1987 | Yasuda et al. |
| 5,126,991 A | 6/1992 | Verboom |
| 5,282,185 A | 1/1994 | Mori et al. |
| 5,295,127 A | 3/1994 | Verboom et al. |
| 5,764,608 A | 6/1998 | Satomura |
| 5,946,329 A | 8/1999 | Hirose et al. |
| 6,091,687 A | 7/2000 | Verboom et al. |
| 6,094,408 A | 7/2000 | Verboom |
| 6,100,829 A | 8/2000 | Fredrickson et al. |

*Primary Examiner*—Thang V. Tran
(74) *Attorney, Agent, or Firm*—Oppenheimer Wolff & Donnelly LLP

(57) ABSTRACT

A method, circuit and system for selectively and adaptively effecting conditioning of selected samples of a read signal in storage technologies. A circuit embodying the present invention includes sample logic, arithmetic logic and conditioning logic. The sample logic receives samples and provides a main sample and one or more selected neighbor samples. The arithmetic logic compares the main sample to the neighbor samples toward determining satisfaction of selected conditioning criteria. If the selected conditioning criteria are satisfied, the conditioning logic selectively and adaptively effects level conditioning as to the main sample. Further, the level conditioning is combined with a rule compliance system to insure the read data is following the protocol of the data coding format being used. A method embodying the present invention comprises obtaining level conditioning parameters in association with a reference field of the read signal; sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected conditioning criteria; applying, where the selected conditioning criteria are determined to be satisfied, level conditioning to the main sample, such level conditioning being responsive to the level conditioning parameters.

29 Claims, 9 Drawing Sheets

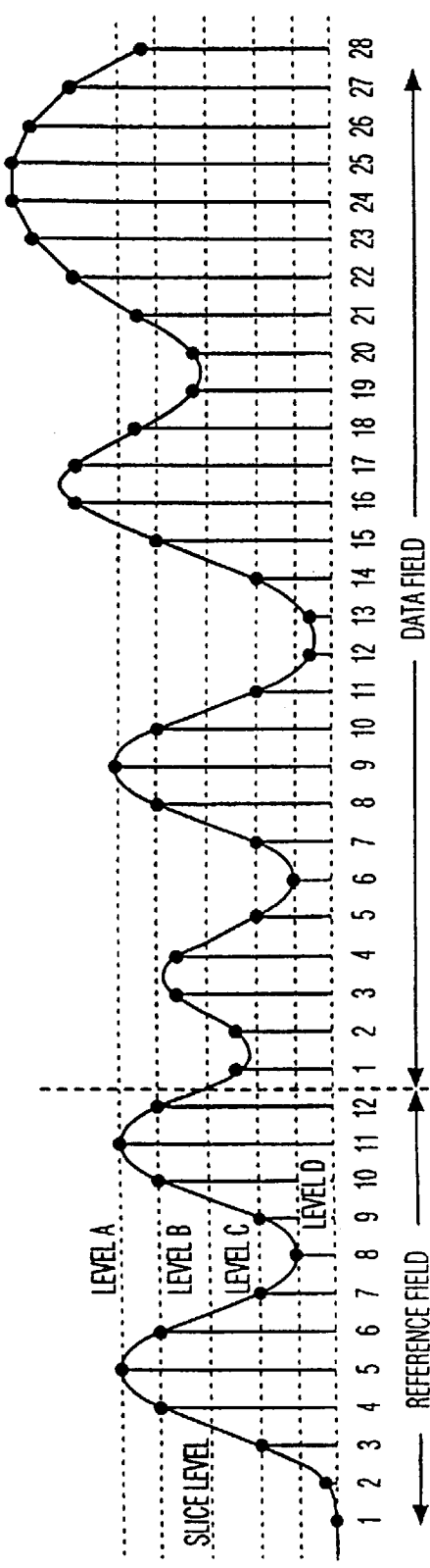
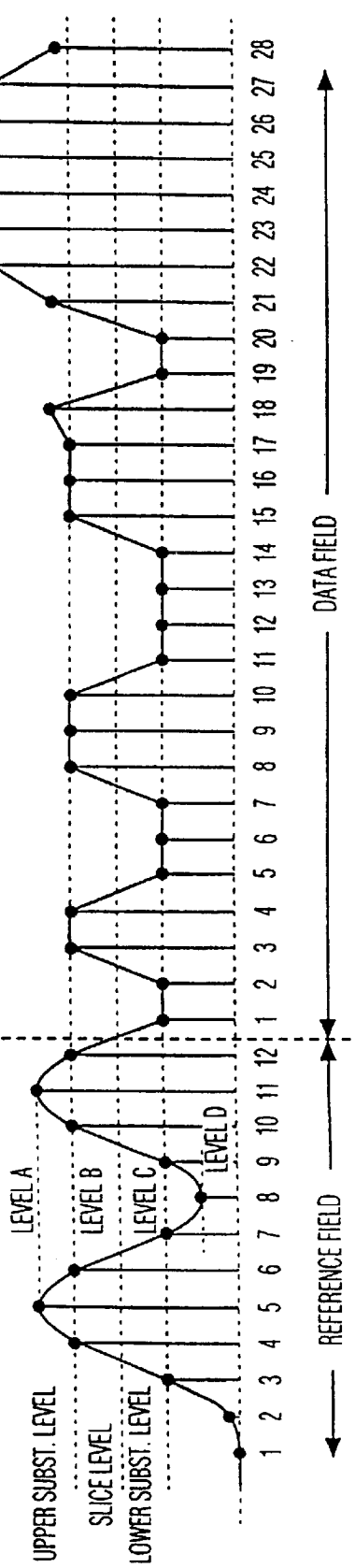
Figure 1a
Figure 1b

ENHANCED ADAPTIVE AND SELECTIVE ISI CANCELLATION FOR A READ CHANNEL IN STORAGE TECHNOLOGIES

RELATED APPLICATION

This application is a continuation of U.S. patent application Ser. No. 09/561,485, entitled ENHANCED ADAPTIVE AND SELECTIVE ISI CANCELLATION FOR A READ CHANNEL IN STORAGE TECHNOLOGIES, filed Apr. 28, 2000, now U.S. Pat. No. 6,205,103, which is a Continuation-In-Part of U.S. patent application Ser. No. 09/107,808, entitled ADAPTIVE AND SELECTIVE LEVEL CONDITIONING OF A READ CHANNEL IN STORAGE TECHNOLOGIES, filed Jun. 30, 1998, now U.S. Pat. No. 6,118,746.

Additionally, U.S. patent application of Johannes J. Verboom and Fred N. Wamble, Ser. No. 08/994,874, filed Dec. 19, 1997, and entitled METHOD AND APPARATUS FOR MAXIMUM LIKELIHOOD DETECTION, is hereby incorporated by reference. U.S. patent application of Johannes J. Verboom, Ser. No. 09/105,856 (PHA 23-326), filed Jun. 26, 1998, and entitled ADAPTIVE AND SELECTIVE CANCELLATION OF INTER-SYMBOL INTERFERENCE OF A READ CHANNEL IN STORAGE TECHNOLOGIES, is hereby incorporated by reference.

BACKGROUND OF THE INVENTION

The invention relates generally to data recovery of storage technologies, and more particularly to methods, apparatuses and systems for data recovery by adaptive and selective level conditioning and data recognition of a read channel of storage technologies.

Advances in manufacturing technologies and system architecture have led to increasingly powerful consumer electronic devices and computers. These consumer electronic devices and computers support features and applications, such as multimedia, in connection with which vast amounts of information are processed and stored. Generally, the amount of information is not only vast, but also ever-increasing.

To provide the information, storage technologies have been developed, including magnetic, optical and magneto-optical technologies. Although these technologies provide relatively large storage capabilities, the technologies generally demand ongoing improvement so as to overcome factors limiting storage capacity. Among other areas for ongoing improvement is the accurate detection of recorded data, particularly while increasing the recording density.

Detection of recorded data is conventionally accomplished using a threshold. As an example, channel bits of an optical read channel (using, for example, 1,7 run-length-limited modulation coding) are detected by comparing a read signal to a predetermined threshold: if the read signal exceeds the threshold at a particular channel-bit location, that channel-bit is considered a '1' (i.e., a mark); otherwise the channel-bit is considered a '0' (i.e., a space).

Detection against a threshold typically relies on setting an appropriate threshold. Generally, the threshold is set toward recovering recorded information within an acceptable bit error rate. To do so, the threshold optimally is set to the center of an "eye-pattern", the eye-pattern being a measure that indicates the amplitude and phase margins of the read signal. However, the read signal's amplitude and phase margins tend to be affected by various parameters, including, among others, the write power, the write sensitivity of the media, the quality of the spot of the write and read drives (e.g., mark size variations), the focus offset of the write and read drives, and the recording density. For example, increased recording density tends to increase inter-symbol interference ("ISI") such that amplitude margins can degrade as to both marks and spaces. Moreover, because these parameters vary across systems and media, the center of the eye pattern tends to vary and, in turn, the optimal threshold setting tends to vary.

When reading channel bits of an optical channel, using any one of a plurality of coding methodologies, the correct data patterns must follow prescribed rules and protocol. For example, using 1,7 run length limited modulation coding, the highest frequency possible consists of 2T marks on space (where T=one channel bit period). Due to optical aberrations, interference, and other data reading complications, information read from optical drive occasionally does not comply with these prescribed rules, creating data reading errors.

Accordingly, it is desirable to provide for accurate detection of recorded data while accommodating increased recording density and other parameters that tend to cause the threshold to vary and margins to degrade. Further, it is desirable to insure compliance with the data coding rules for the type of recording protocol used.

SUMMARY OF THE INVENTION

Methods, circuits and systems are provided for enhancing the accuracy of detection of recorded data while accommodating increased recording density and other parameters that tend to cause the threshold to vary and margins to degrade. More specifically, methods, circuits and systems are provided that adaptively and selectively condition the levels of samples of a read signal. Additionally, the methods, circuits and systems further check the conditioned read signal for compliance with applicable data coding rules. An advantage of the method, circuit and system is that reliable margins are established for selected samples and data cross checking is implemented, thereby improving detection and accuracy of recorded data, particularly at enhanced recording density.

A circuit embodying one aspect of the present invention includes sample logic, arithmetic logic and conditioning logic. The sample logic receives samples and provides a main sample and one or more selected neighbor samples. The arithmetic logic compares the main sample to the neighbor samples toward determining satisfaction of selected conditioning criteria. If the selected conditioning criteria are satisfied, the conditioning logic selectively and adaptively affects level conditioning as to the main sample. Preferably, the conditioning is bi-level substitution, wherein either an upper substitution level or a lower substitution level is substituted for a selected main sample. Alternatively, the level conditioning can include the substitution of a logical zero or a logical one for the subject channel bit, or the creation of a parallel data value determination.

In yet a further aspect of the invention, additional circuits include compliance logic, a threshold detector (i.e., slicer) and overruling logic. The compliance logic will receive signals from conditioning logic indicating certain conditions of the main sample and selected neighbor samples. The compliance logic further checks these signals for compliance with certain protocols or coding rules. If the data is compliant with the coding rules, no further adjustments are done. However, if the data is not compliant, further checking is accomplished and, where appropriate, signals will be sent to the overruling logic to further apply level adjustment to the main sample. In one case, level adjustment includes the overruling of data detected by the slicer.

The threshold detector receives data samples from the read logic of the optical storage system. These data samples are applied to a threshold to create a preliminary determination regarding the data. Specifically, the data is preliminarily determined to be either a 1 or 0 based upon a raw threshold determination. However, as mentioned above, this threshold determination can include many errors, due to the recording density and related degraded margins. In order to correct these still existing potential errors, further circuitry (as described above) is provided for receiving this preliminary determination and overruling this initial determination where appropriate.

In summary, the circuitry is capable of applying the level conditioning criteria, and the rule compliance criteria in order to assess the accuracy of a parallel threshold determination. Subsequently, if the threshold determination did not appear to include errors, no additional processing is necessary and the initial assessment is used. The initial assessment can be accomplished using traditional bit slice technology (threshold detection), or any other appropriate technology. Alternatively, if the level of conditioning criteria indicates that an adjustment is necessary, the overruling circuitry will appropriately cancel the initial assessment and either set or reset that channel bit appropriately. Furthermore, rule compliance circuitry is included to insure that the read channel bits comply with the rules prescribed for the particular data coding methodology being used. Based on this compliance evaluation, the preliminary assessment can also be overruled as appropriate.

A method embodying the present invention comprises obtaining level conditioning parameters in association with certain reference marks of the read signal: sampling the read signal at channel bit locations to provide a plurality of samples; selecting a main sample from the plurality of samples; selecting one or more neighbor samples from the plurality of samples, the neighbor samples being disposed at predetermined distances, in channel bits, from the main sample; comparing the main sample to each of the neighbor samples to determine satisfaction of selected conditioning criteria; and applying, where the selected conditioning criteria are determined to be satisfied, level conditioning to the main sample responsive to the level conditioning parameters.

An alternative method utilizing concepts of the present invention includes a step of level conditioning as outlined above in conjunction with a parallel threshold detection and further compliance analysis. Specifically, the level conditioning above will create a preliminary logical determination as to whether the subject channel bit is a logical one or a logical zero. Utilizing this information, along with the raw read data itself, the subject channel bit is analyzed to ensure it complies with the rules of the particular data coding protocol being used. Where appropriate, the results from the level conditioning and the compliance analysis will be used to overrule the initial determination from the threshold detector.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

BRIEF DESCRIPTION OF THE DRAWINGS

FIG. 1(a) shows a read signal, the read signal having reference and data fields.

FIG. 1(b) shows a processed read signal, the processed read signal having reference and data fields, including data marks and spaces subject to level conditioning.

DETAILED DESCRIPTION

Terminology

Figure 2:
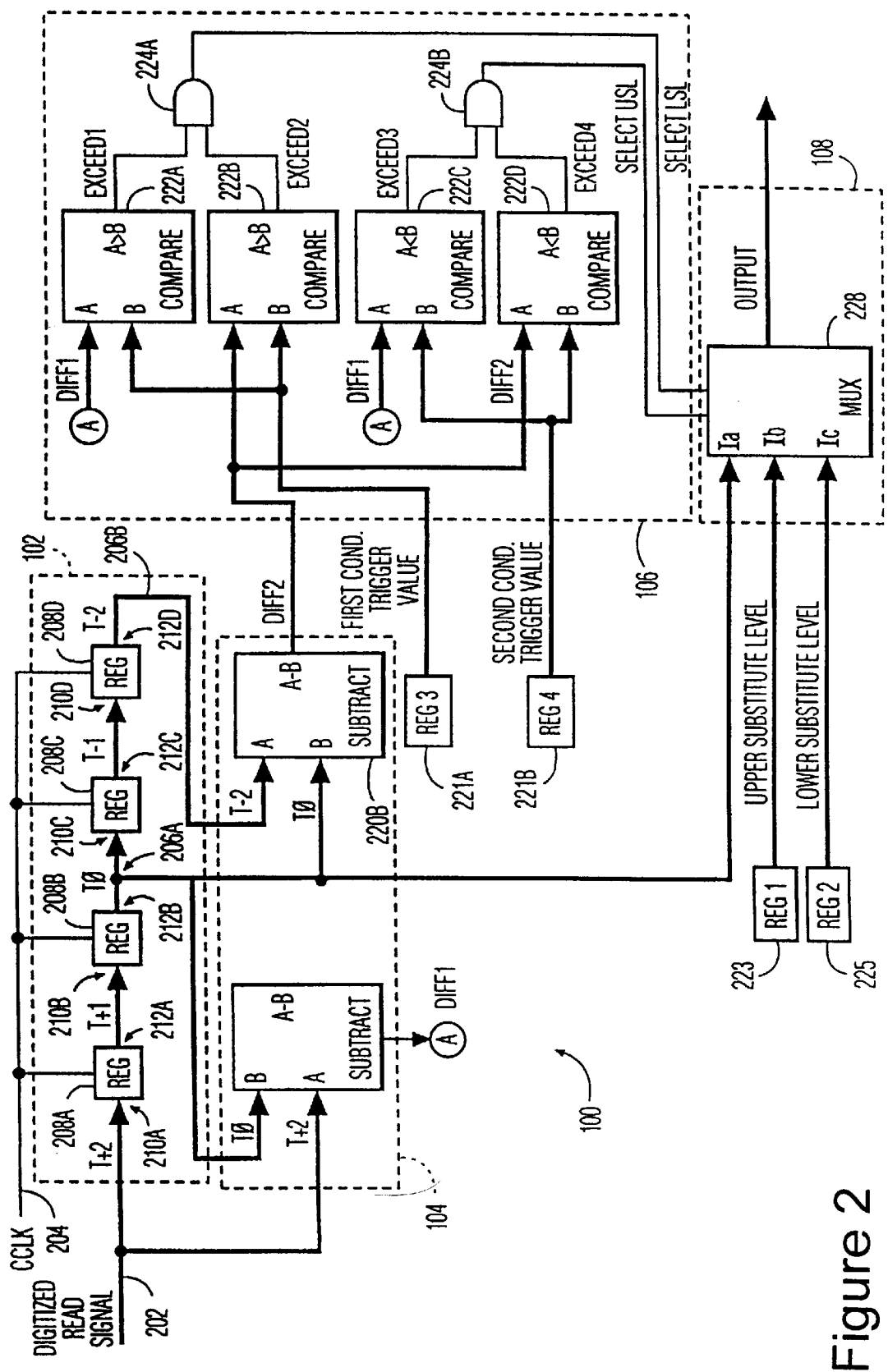
FIG. 2 is a block diagram of a level conditioning circuit associated with a read channel, in accordance with the present invention.

Read channel, as used herein, refers to optical, electrical, magnetic and mechanical elements that deliver signals from the surface of recording media to processing elements for conversion to formats convenient for a user.

K-constraint, as used herein, refers to the maximum number of consecutive logical zeroes (or ones) in any sequence of binary channel bits, in which the logical ones (zeroes) represent the location of signal transitions.

D-constraint, as used herein, refers to the minimum number of consecutive logical zeroes (or ones) in any sequence of binary channel bits, in which the logical ones (zeroes) represent the location of signal transitions. The D-constraint is employed to determine the distance between samples for evaluation in selecting channel bits subject to level substitution, as described more fully below.

Level conditioning, as used herein, refers to manipulating selected samples so as to enhance performance (e.g., reliability) in detection or otherwise including the designation of logical polarity. Advantages of level conditioning include, as an example, improved detection of logical polarity (i.e., '1' or '0') for channel bits of a read signal, particularly in the case of enhanced recording density or other circumstances that can lead to read errors (e.g., due to threshold variation or margin degradation).

Overview

Embodiments of the present invention apply level conditioning to selected samples of a read signal. Level conditioning is implementable variously. Level conditioning preferably is responsive to level conditioning parameters. The level conditioning parameters preferably are obtained in association with predetermined patterns of marks and spaces in a reference field of the read signal. In one embodiment, level conditioning is implemented by assigning one of one or more substitution levels to a sample, the substitution levels preferably being derived from the level conditioning parameters. In this embodiment, it is preferred that the derivation entails setting each substitution levels equal to a respective level conditioning parameter. In such case, the level conditioning parameters preferably are based on various levels detected from the patterns of the reference field. It is to be understood in such case, however, that the level conditioning parameters may be otherwise based and the substitution levels need not be set equal to a respective level conditioning parameter. Alternatively, level conditioning includes the assignment of a logical value to the subject channel bit based upon the level conditioning criteria. In yet a further embodiment, level conditioning involves the creation of a parallel conditioning signal.

However implemented, level conditioning preferably is adaptable. With assignment of substitution levels, adaptable level conditioning comprises adaptively obtaining level conditioning parameters and/or adaptively deriving substitution levels. In such case, adaptively deriving one or more substitution levels entails updating, adjusting and/or repeatedly deriving the levels (e.g., at set intervals and/or responsive to one or more triggering events).

Reference Marks

In an illustrative embodiment of the present invention, a disk is formatted to comprise a plurality of tracks, each track including a selected number of segments (e.g., 225), and each segment having a selected number of frames (e.g., 16). Each frame comprises one or more fields. The fields contain pre-formatted marks that are employed to provide selected functions, including, among others, clock synchronization, track following, track capturing, addressing and track counting.

Each frame also comprises a recordable field. The recordable field is provided for recording user data. The data is organized in logical sectors, each sector preferably beginning at a frame boundary. Each sector comprises a selected number (e.g., 1024 or 2048) of data bytes, together with other information. Such other information provides one or more functions including, among others, error correction.

FIGS. 1(a) and (b) show typical read signals of a read channel, according to the present invention. Each read signal includes (i) reference marks and spaces in a reference field, (ii) illustrative data marks and spaces in a data field, the data field comprising user data and (iii) various levels, including threshold (a.k.a., "slice") levels. Although the illustrated read signals are analog, each preferably is processed as discrete values sampled at a selected frequency.

According to the principles of the invention, selected samples associated with the reference field are employed in level conditioning. In one embodiment, the selected samples are detected to obtain level conditioning parameters. In a more specific embodiment, the selected samples are detected using a selected pattern of marks and spaces in the reference field. In an embodiment wherein level conditioning comprises assignment of substitution levels, the pattern preferably is employed to obtain level conditioning parameters from which are derived upper and/or lower substitution levels: an upper substitution level having an amplitude that is greater than the prevailing detection threshold and a lower substitution level having an amplitude that is lesser than the prevailing detection threshold.

The reference field preferably has patterns of marks and spaces selected to optimize level conditioning. For example, it is preferred that the reference field has a pattern representative of worst case detection characteristics likely to occur in association with a data field, such that the level conditioning optimally enhances detection accuracy. As an example, the patterns preferably have a space-distances between marks that, while complying with coding (e.g., 1,7RLL, 2,7RLL, NRZ, 8/9, EFM+, etc. ), maximally stress the system.

The reference patterns can be variously provided. The reference patterns preferably comprise either or both (i) a selected set (e.g., number and arrangement) of predetermined marks and spaces located in one or more of the frames and (ii) preamble bytes associated with each sector. In one embodiment, the selected set comprises two marks located in a frame's recordable field and covering twelve channel bits, as shown in FIGS. 1(a) and (b). In this embodiment, the predetermined marks preferably are repeated in each frame such that they are interleaved in the user data, e.g., the user data of one logical sector typically being stored in plural frames with each frame including the predetermined marks.

In another embodiment, the preamble bytes preferably are twelve in number (e.g. where the user data bytes are 2048 in number) and comprise two marks per byte (i.e., 24 total marks), all of which marks are located in the recordable field of the first frame associated with the sector.

In another embodiment, the preamble bytes correspond to the selected set. For example, the two predetermined marks of the selected set are employed 1 to 12 times in the sectors first frame in providing the preamble. In so doing, functions associated with the marks can be implemented based on one or more algorithms and using isolated and/or redundant reference mark information.

If the preamble consists of 12 occurrences of the selected set, the samples preferably are averaged (or otherwise manipulated) over the 12 bytes in obtaining the level conditioning parameters at the beginning of each sector. Thereafter, the level conditioning parameters preferably are obtained, adjusted or updated using all or a portion of the selected set in one or more frames subsequent to the first frame of the sector, e.g. either non-preamble marks or subsequent preamble marks (hereinafter, the term "adaptive acquisition" is sometimes used to refer to, any or all of, obtaining, adjusting and/or updating respective level conditioning parameters).

As an example, the level conditioning parameters are updated or adjusted based on any or all of the selected set located in one or more frames subsequent to the first frame of the sector (e.g., redundant reference mark information). The update/adjustment can be based on such selected set either individually from a frame, or in groups, or collectively across frames. In this example, level conditioning is responsive to the level conditioning parameters associated with the subsequent frames' selected set, the level conditioning thereby being updated on an ongoing basis. It is understood, however, that level conditioning can also be updated from one or more of the subsequent frames' selected set (all or part thereof) in the absence of adjustments to the level conditioning parameters, without departing from the principles of the invention.

As another example, the level conditioning parameters are obtained based solely on the portion of the selected set that is located in one or more frames subsequent to the first frame of the sector (e.g., isolated reference mark information). In this example, level conditioning preferably is repeatedly obtained on an ongoing basis, the level conditioning associated with a frame being derived from the level conditioning parameters associated with the selected set in that frame in the sequence of frames, and without reference to level conditioning parameters of other sets of other frames.

Although the reference patterns can be provided as specifically described above, it is understood that such patterns can be otherwise provided without departing from the principles of the invention. For example, while the above-description locates the reference patterns in the recordable fields of the frames, it is understood that some or all of a reference pattern can be preformatted. However, it is preferred that the reference patterns be recorded with the user data in the recordable field so that the reference patterns are subject to parameters prevailing as the user data is written/read.

Level Conditioning Parameters

It is to be understood that the level conditioning parameters are obtainable from information of the reference field using various arrangements. Referring to FIGS. 1(a) and (b), examples of arrangements include:

1) Detect the value of any one of samples 4, 6, 10 or 12: or
2) Detect and average the values of all or some combination of samples 4, 6, 10 and 12; or
3) Detect the value of any one of samples 3, 7 or 9; or
4) Detect and average the values of all or some combination of samples 3, 7 and 9; or
5) Detect the values of samples 5 and/or 11, averaging if both samples are detected; or
6) Detect the value of sample 8; or
7) Combine one or 1) or 2) above with one of 4) or 5) above, with or without combining 5) and/or 6).

Notwithstanding the above example arrangements, it is understood that other arrangements can be implemented in obtaining level conditioning parameters (e.g., interpolation, multiple alternative computations, and the like), without departing from the principles of the invention.

In the first example, it is preferred that the level conditioning parameters be obtained by (i) digitizing the read signal via an appropriately fast analog-to-digital converter, and (ii) acquiring the applicable sample for storage in a register. In the second example, it is preferred that the level conditioning parameters be obtained by (i) digitizing the read signal via an appropriately fast analog-to-digital converter, (ii) acquiring samples for accumulation, e.g., in a register, and (iii) manipulating the contents of the register to obtain the average result.

It is to be understood level conditioning preferably is responsive to the level conditioning parameters. In one embodiment, level conditioning comprises assigning a selected substitution level to a selected sample, the substitution level being derived from the level conditioning parameters. This substitution level may, in some implementations, simply designate the appropriate logic polarity based upon the level conditioning parameters. In another embodiment, level conditioning can comprise manipulating a sample other than by such assignment, including, as an example, by applying an offset, in which case the offset preferably is derived from the level conditioning parameters. As yet another example, level conditioning can employ a calculation based on the level conditioning parameters. It is understood that level conditioning may be responsive to the level conditioning parameters, but engender processes other than as described herein, without departing from the principles of the invention.

FIGS. 1(a) and (b) also illustrate that level conditioning preferably is applied only for samples of the data field.

Level Conditioning Method

FIGS. 1(a) and (b) illustrate a read signal. The read signal has two initial reference marks, these marks being followed, in a data field, by marks and spaces in a 1,7RLL coding sequence. Moreover, as illustrated, samples 1, 2, 3, 4, 19 and 20 have levels near to the detection threshold TH. As to these samples, then, the tendency for a read error typically increases, e.g., responsive to noise and/or threshold transients. As such it is desirable to apply level conditioning to these samples in order to improve their respective amplitude margins.

Accordingly, the level conditioning method is directed to identify samples such as samples 1, 2, 3, 4, 19 and 20 and, where appropriate, to apply level conditioning thereto. Moreover, the level conditioning method is directed to so identify samples selectively: preferably only those samples that are likely to cause read errors are selected. In addition, the level conditioning method is directed to be adaptive, where adaptability preferably is achieved from information of the reference field (e.g., including from information relating to one or both of preamble marks and interleaved marks).

In the method based on FIGS. 1(a) and (b), the read signal is sampled at channel bit locations to obtain main and neighbor samples. The main samples are tested against selected conditioning criteria to determine whether level conditioning is to be applied. For this illustration, the selected conditioning criteria are satisfied either (a) if a main sample has a level that is less than the levels of both of the two neighbor samples disposed at predetermined distances (here, two channel bits) from the main sample or (b) if a main sample has a level that is greater than the levels of both of the two neighbor samples disposed at predetermined distances (here, two channel bits) from the main sample. Stated more generally, in the case of one main and two neighbor samples, selected conditioning criteria typically comprise determining that a common arithmetic sign is associated with the differences between the levels of the main sample and each of the respective neighbor samples.

Level conditioning preferably is effected by assigning an upper or lower substitution level to the main sample. For example, if the main sample is greater than both of the neighbor samples, then an upper substitution level is assigned to the main sample. However, if the main sample is less than both of the neighbor samples, then a lower substitution level is assigned to the main sample. While, in this embodiment, the upper and lower substitution levels are described as a single pair, it is to be recognized that other arrangements can be employed without deviating from the principles of the invention. Examples of other arrangements include: (i) pairs need not be employed, (ii) the pairings may be unbalanced (e.g., three upper substitution levels paired with a two lower substitution levels), and (iii) more than one pair of substitution levels may be employed. Particularly in the latter two examples, the assignment of a particular substitution level from among plural (upper and lower) substitution levels preferably is determined according to selected assignment criteria. Clearly, these substitution levels can include a single pair which is indicative of logical polarity.

So as to preclude inappropriate selection of a sample for level conditioning, the main sample preferably is selected for level conditioning only if a preclusion function is satisfied. The preclusion function preferably uses selected, one or more conditioning trigger values; as such, level conditioning is effected provided that the appropriate conditioning trigger value is exceeded by the difference between the levels of (i) the main sample and (ii) selected of the neighbor samples. In the illustrated example, level conditioning is effected using level substitution. In that embodiment, level substitution of a lower substitution level is effected when a first conditioning trigger value is exceeded by the difference between the levels of (i) the main sample and (ii) both of the neighbor samples, whereas level substitution of an upper substitution level is effected when such difference is exceeded by a second conditioning trigger value. In any case, the conditioning trigger values preferably are determined using selected parameters, including ripple and/or noise. Moreover, as described further below, the conditioning trigger values preferably are derived from information of the reference field.

As is also described further below, the distance between the main sample and the neighbor samples preferably is selected to optimize level conditioning. The selection typically responds to factors, such as coding. In the case of 1,7RLL coding, for example, the distance preferably is two channel bits on either side of the main sample.

Level Conditioning Circuit

Referring to FIG. 2, a level conditioning circuit 100 is shown, in accordance with the present invention. Level conditioning circuit 100 comprises sample logic 102, arithmetic logic 104, sample selection logic 106 and conditioning logic 108. In the illustrative embodiment shown in FIG. 2, circuit 100 is implemented responsive to 1,7RLL coding.

The sample logic 102 receives a digitized read signal 202 and generates a main and two neighbor signals, the main samples being selectively chosen for level conditioning. Sample logic 102 has selected taps 206A and 206B, and is clocked by a channel clock 204 (CCLK).

Sample logic 102 also has memory elements 208A, 208B, 208C and 208D. Each of the memory elements 208A–D receives the CCLK 204 and is one bit deep so as to introduce a one clock cycle delay. The memory elements 208A–D have respective input terminals 210A–D and output terminals 212A–D. The output terminal 212A is coupled to the input terminal 210B; the output terminal 212B is coupled to the input terminal 210C; and the output terminal 212C is coupled to the input terminal 210D. The output terminals 212B and 212D are coupled to taps 206A and 206B, respectively.

The input terminal 210A receives the digitized read signal 202. Accordingly, as clocked by CCLK 204, the digitized read signal is provided (i) at tap 206A after two clock cycles of delay following receipt at input terminal 210A and (ii) at tap 206B after four clock cycles of delay following such receipt, i.e., two clock cycles of delay following provision at tap 206A. For the discussions that follow, (a) T0 denotes the main signal, i.e, samples of the delayed digitized read signal as provided at tap 206A, (b) T-2 denotes a first neighbor signal, i.e., samples of the delayed digitized read signal as provided at tap 206B and (c) T+2 denotes a second neighbor signal, i.e., samples of the digitized read signal 202 as received by the level conditioning circuit 100.

Taps 206A and 206B and input terminal 210A are coupled to arithmetic logic 104. Arithmetic logic 104, as illustrated, comprises subtractors 220A and 220B. In this example, tap 206A is coupled to each of subtractors 220A and 220B, while subtractor 220A is also coupled to the input terminal 210A, and while subtractor 220B is also coupled to tap 206B. Subtractor 220A subtracts each sample of T0 from a corresponding sample of T+2 to provide an output signal Diff1. Subtractor 220B subtracts each sample of T0 from a corresponding sample of T-2 to provide an output signal Diff2.

The output signals Diff1 and Diff2, as shown, are provided to sample selection logic 106. Sample selection logic 106, as illustrated, comprises (a) comparators 222A, 222B, 222C and 222D and (b) control logic 224A and 224B. Comparators 222A and 222B compare respective output signals Diff1 and Diff2 to a selected first conditioning trigger value and, based thereon, provide respective signals Exceed1 and Exceed2. Comparators 222C and 222D compare respective output signals Diff1 and Diff2 to a selected second conditioning trigger value and, based thereon, provide respective signals Exceed3 and Exceed4. The Exceed1 and Exceed2 signals are provided as inputs to control logic 224A, while the Exceed3 and Exceed4 signals are provided as inputs to control logic 224B. Control logic 224A and 224B, in this illustration, are implemented as respective AND gates. Control logic 224A and 224B provide, respectively, a Select LSL signal and a Select USL signal.

Although the first and second conditioning trigger values are shown provided to the comparators 222A–D from memory elements 221A and 221B, it is to be recognized that the conditioning trigger values can be otherwise provided, without departing from the principles of the invention. Moreover, it also to be recognized that a single trigger value can be used, provided by any of the structure previously described, without departing from the principles of the invention.

The comparison to one or more conditioning trigger values preferably is implemented so as to preclude selection of samples for level conditioning (referred to sometimes herein as the "preclusion function"). In implementing the preclusion function, it is preferred that conditioning trigger values be derived from information of the reference field. As one example, in the case of level substitution, the conditioning trigger values preferably are set to a fraction (e.g., one-half) of a respectively associated substitution level. As another example, the conditioning trigger values are based on characterization of ripple, such as by including appropriate mark(s) and/or spaces in the reference field. As yet another example, the conditioning trigger values are based on characterization of channel noise. As still another example the conditioning trigger values are based on a combination of one or more of the above, with or without additional parameters. In any case, it is understood that other trigger setting approaches can be used without departing from the principles of the invention.

The preclusion function can be selectively disabled or not implemented. In such cases, the conditioning trigger values preferably are set to a reference amplitude, e.g., zero.

The conditioning logic 108 is coupled to the sample logic 102 and to the sample selection logic 106. From the sample logic 102, the conditioning logic 108 receives samples of T0. From the sample selection logic 106, the applying circuit 228 receives the Select USL and Select LSL signals.

In a level-substitution-based embodiment, the conditioning logic 108 preferably comprises applying circuit 228 coupled to memory elements 223 and 225. From memory elements 223 and 225, the applying circuit 228 receives, as respective inputs, a signal comprising an upper substitution level and a signal comprising a lower substitution level. Although these substitution levels are shown provided to the applying circuit 228 from respective memory elements 223 and 225, it is to be recognized that these substitution levels can be otherwise provided, without departing from the principles of the invention.

In operation of the level-substitution-based embodiment, the applying circuit 228 provides an output signal under control of the, Select USL and Select LSL signals. To illustrate, control is as shown in Table 1 (a truth table, wherein S-USL represents the Select USL signal, S-LSL represents the Select LSL signal, and Output represents the output signal of applying circuit 228):

TABLE 1

| S-USL | S-LSL | Output |
|---|---|---|
| 0 | 0 | T0 sample |
| 0 | 1 | Lower Substitute Level |
| 1 | 0 | Upper Substitute Level |
| 1 | 1 | Invalid/Special |

As shown in this table, if both Select signals are low, the T0 sample is output. However, if one of the Select signals is high, the substitution level associated with the high signal is output. Moreover, if both of the Select signals are high, an invalid/special state is present. In this state, the T0 sample can be output or, alternatively, special processing can be provided. For typical conditioning trigger values, this invalid/special state would not arise. As such, special processing would generally be triggered by additional logic controlling either/both the conditioning trigger values, the conditioning circuit 108 and/or the sample selection logic 106.

Special processing can include processing other than the level conditioning described herein. As an example, such special processing could entail processing of the read signal for reasons differing from, or even antithetical to, the promotion of read accuracy.

As illustrated, the applying circuit 228 preferably is implemented as a three input multiplexer under control of the Select USL and LSL signals received from the sample selection logic 106.

The level conditioning circuit 100 of the illustration, as previously described, is responsive to 1,7 run-length-limited (RLL) modulation code. For example, the circuit 100 comprises sample logic 102 having four memory elements 208A–D. These elements having taps 206A and 206B and introducing clock cycle delays such that, as docked by CCLK 204, the digitized read signal is provided (i) at tap 206A after two clock cycles of delay following receipt at input terminal 210A and (ii) at tap 206B after two clock cycles of delay following provision at tap 206A. So configured, the sample logic 102 is enabled to provide (a) the main signal T0 of samples at tap 206A, (b) a first neighbor signal T−2 of samples at tap 206B and (c) a second neighbor signal T+2 of samples as such signal is originally received by the level conditioning circuit 100. Generally, this implementation responds to the constraint of the RLL coding: because the d-constraint defines the minimum distance between channel-bit transitions, the d-constraint determines the distance of the two neighbor signals of samples to be evaluated in determining whether samples in the main signal are subjected to level conditioning.

For codes other than; 1,7RLL, the d-constraint typically changes. Responsive thereto, the level conditioning circuit 100 typically is implemented differently than as illustrated. As an example, the sample logic 102 typically is implemented with a different number of memory elements 208 and/or differently-distanced taps 206, so as to provide main and neighbor signals having an appropriate delay relationship. Table 2 shows, for various example codes, the d-constraint and distance of neighbors (in channel-bits).

TABLE 2

| Code | D-constraint | Distance of Neighbors |
|---|---|---|
| NRZ | d = 0 | 1 |
| 8/9 | d = 0 | 1 |
| 1,7RLL | d = 1 | 2 |
| 2,7RLL | d = 2 | 3 |
| EFM + | d = 2 | 3 |

Figure 3:
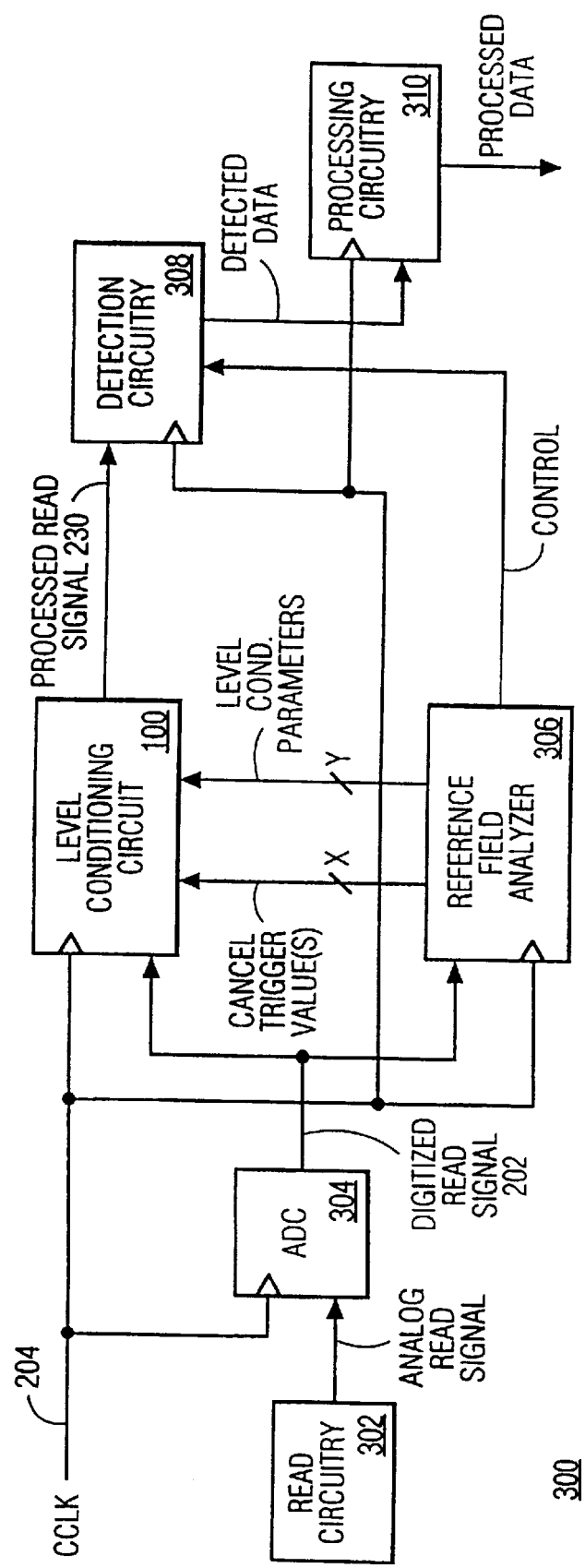
FIG. 3 is a block diagram of a storage system, the system including a level conditioning circuit associated with a read channel, in accordance with the present invention.

FIG. 3 is a block diagram of a storage system 300, in accordance with the present invention. The storage system 300 comprises: (i) read circuitry 302 that provides for reading the storage media so as to generate an analog read signal; (ii) an analog to digital converter (ADC) circuit 304 that receives the analog read signal and generates therefrom the digitized read signal 202; (iii) reference field analyzer 306 which receives the digitized read signal and, based on the marks and/or spaces of one or more reference fields, obtains one or more level conditioning parameters and, if so implemented, one or more conditioning trigger values and detection control signals: (iv) the level conditioning circuit 100 which receives the digitized read signal, the conditioning trigger values and the level conditioning parameters so as to generate the processed read signal 230, such signal 230 comprising a read signal for which level conditioning is selectively (and, preferably, adaptively) effected as to selected samples: (v) detection circuitry 308 which (a) receives both the processed read signal 230 from the level conditioning circuit 100 and the detection control signals from the reference field analyzer 306 and (b) generates an output signal comprising detected data (e.g., a sequence of transitions); and (vi) processing circuitry 310 for processing the data of the detection circuitry's output signal. The system 300 also preferably comprises the channel clock (CCLK) 204, which is applied to and clocks each of the above components.

The detection circuitry 308 can be variously implemented within the principles of the invention. As an example,. .the circuitry 308 can be implemented to provide conventional bit-slice technology (i.e., detection based on a threshold). As another example, the circuitry 308 can be implemented to provide an adaptive bit-slice technology. As yet another example, the circuitry 308 can be implemented to provide maximum likelihood detection mechanism, as such mechanism is described in the U.S. patent application of Johannnes J. Verboom and Fred N. Wamble, Ser. No. 08/994,874, filed Dec. 19, 1997, and entitled METHOD AND APPARATUS FOR MAXIMUM LIKELIHOOD DETECTION, which is hereinabove incorporated by reference.

In each case, it is preferred that the detection circuitry 308 be coupled to the reference field analyzer 306 so as to receive detection control signals which are relevant to operation of the detection circuitry 308. As to a maximum likelihood detection mechanism, the detection control signals indicate, e.g., the clip level applicable to the digitized read signal.

As to both conventional and adaptive bit-slice technology, the detection control signals preferably indicate the detection threshold applicable to each sample. For conventional bit slice technology, the detection threshold typically is fixed, being derived from selected samples of the reference field (e.g., the detection threshold is based on the average of samples 3, 4, 9 and 10). For adaptive bit slice technology, the detection threshold tends to vary. As an example, the detection threshold can be derived from samples of the reference field, the threshold being updated, adjusted or re-derived at predetermined intervals, or based on predetermined stimuli, or based on combinations of both.

The system 300 can be otherwise implemented without departing from the principles of the invention. As an example, the detection circuitry can generate its own detection control signals, rather than receiving these signals from the reference field analyzer 306. In such case, the Processed Read Signal 230 preferably comprises reference field information.

As another example, so as to provide each or any of the conditioning trigger values and the level conditioning parameters, the system 300 preferably comprises respective registers for updating/adjusting each such value/parameter. In this regard, it is contemplated that each of the conditioning trigger values and the level conditioning parameters can be one or more in number (as illustrated in FIG. 3 by use of the "x" and "y" reference letters). It is also contemplated that the reference field analyzer 306 provide, in place of the level conditioning parameters, one or more substitution levels (e.g., upper and/or lower substitution levels, in pairs or other arrangements, as described above), these levels preferably being derived from level conditioning parameters obtained from the reference field of the digitized read signal 202.

As suggested above, the same level conditioning which involves the examination of neighbor channel bits, can be used in parallel with a more standard detection circuit (e.g., a circuit implementing conventional bit slice technology). In this embodiment, the read signal is provided to both a detection circuit and a conditioning circuit. The output of the conditioning circuit can then be used to overrule or adjust the detection circuit output as appropriate. Furthermore, it is possible to utilize a rule compliance circuit, also situated in parallel with the detection circuit and the conditioning circuit. The rule compliance circuit is then similarly capable of overruling the output of the detection circuit where appropriate.

Figure 4:
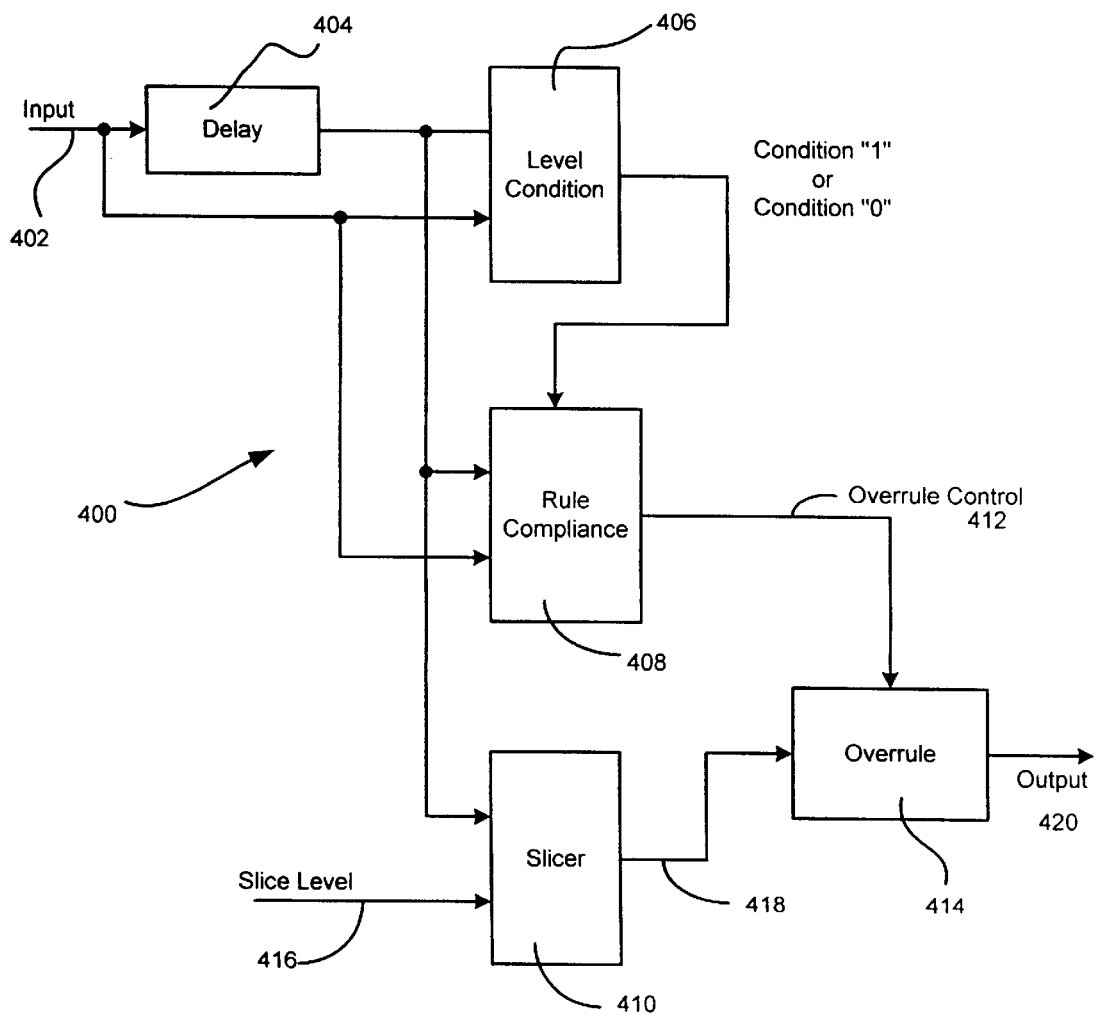
FIG. 4 is a block diagram of a read channel output utilizing the parallel level conditioning, rule compliance, and threshold detection concepts of the present invention.

Referring to FIG. 4, there is shown a block diagram outlining this concept. More specifically, the read signal 402 is provided at an input of an ISI cancellation system 400. Specifically, this read signal is provided to both a delay circuit 404 and a level conditioning circuit 406. Also, the input is provided to a rule compliance circuit 408. At the output of delay circuit 404, a delayed signal input is provided to level conditioning circuit 406, rule compliance circuit 408, and detection circuit 410 (i.e. slicer 410). By using delay circuit 404, rule compliance circuit 408 and level conditioning circuit 406 are capable of comparing channel bits which are a predetermined distance from one another. For example, in the embodiment utilizing 1,7RLL data coding, the channel bits being analyzed are two time periods apart (2T).

Level conditioning circuit produces an output based upon the level conditioning criteria outlined above. However, in this embodiment, the output is simply a dual state output indicating the level conditioning analysis as to whether a subject channel bit should be identified as a condition 1 or a condition 0. The output from this level of conditioning circuit 406 is then provided to rule compliance circuit 408 for further analysis. As outlined below in further detail, rule compliance circuit 408 insures that the data pattern being received does not include data patterns which are not allowed by the specific data coding methodology being used. For example, in 1,7 RLL data coding, it is required that all marks or spaces be at least two time periods long (2T marks or spaces). Rule compliance circuit 408 insures that these coding rules are complied with. Rule compliance circuit 408 combines this analysis, with the determination made by a level conditioning 406 to produce an output 412 which is provided to overrule circuitry 414.

As previously mentioned, detection circuit 410 receives an input from delay circuit 404. Additionally, a threshold level (slice level) is provided at second input 416. Detection circuit then performs classical threshold detection to produce a preliminary assessment of the subject channel bit. This preliminary assessment is output from detection circuit 410 on output 418. Overrule circuit 414 then receives this preliminary assessment. Based upon the signal on overrule control output 412, overrule circuitry 414 then either outputs the preliminary assessment produced by detection circuit 410, or overrules that value depending upon the findings of level conditioning circuit 406 and rule compliance circuit 408. An appropriate output is then produced at output 420.

As outlined above, level conditioning circuit 406 searches for the 2T marks and spaces in the digitized Read Signal from 1,7 RLL encoded data. Those samples identified as 2T marks or spaces are then considered clear logical ones or logical zeros. Any channel-bit value as defined by the slicer 410 for those signal samples is then overruled.

Figure 5A:
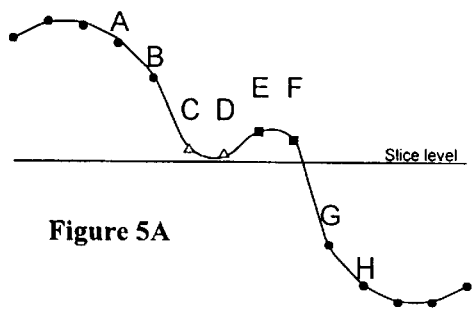
FIG. 5A–5Q include a plurality of waveforms which help to illustrate the principles of level conditioning and rule compliance, in accordance with the present invention.

Referring to FIG. 5A a worst-case waveform is shown, because the 2T space (samples C and D) is preceded by a long mark and the 2T mark (E and F) is followed by a long space. It also shows a slice-level, which in this case is not controlled at the optimal level for the 2T waveforms. The slice-level. is used to make a preliminary decision on all samples, but the signal conditioning may overrule this decision.

In the waveform shown in FIG. 5A, the samples C and D are recognized as a 2T space because the following conditions are all met:

$((C<A)$ AND $(C<E))$ AND $((D<B)$ AND $(D<F))$

Likewise the samples E and F are recognized as a 2T mark because the following conditions are all met:

$((E>C)$ AND $(E>G))$ AND $((F>D)$ AND $(F>H))$

So even though samples C and D are above the Slice-Level, they are turned into logical zeros by the level conditioning. scheme. These "Condition Zeros" (Cond0) are shown as triangles, while the "Condition Ones" (Cond1) are shown as squares. All other samples are shown as dots.

Note that we only make a correction if we detect two consecutive Cond1's or two consecutive Cond0's.

Samples A and B are considered logical ones because they are above the Slice level.

Samples G and H are considered logical zeros because they are below the Slice level.

However, in order to avoid the false detection of the above conditions in the flat parts of long marks and spaces, we require that one other condition is met. Each Cond1 and each Cond0 must be within an Amplitude Window. This amplitude Window is derived from the tops and bottoms of the 3T marks and spaces in the Reference Field of each Data Sector and throughout the sector these levels are updated by the 3T tops and 3T bottoms of the Reference Bytes in each frame. This "3T-window" is likely noncritical because, over a very wide range of Write Powers, the 2T samples are normally well below the 3T tops and well above the 3T bottoms, while the flat parts of long marks and spaces are typically well outside this window.

Figure 5B:
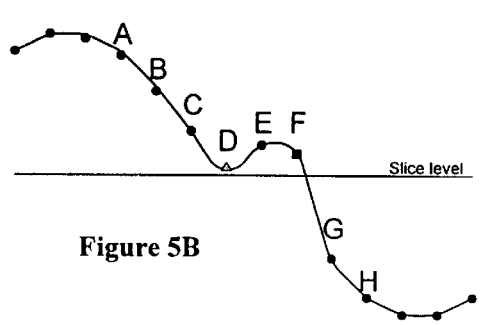

FIG. 5B shows a case in which sample C has risen above E due to a combination of ISI, radial crosstalk and optical aberrations. The above conditions are not met and since C and D are above the slice-level they are both decoded as '1', which of course is wrong.

This is where rule compliance is beneficial. Rule compliance has the following two modifications:

1) If a single Cond0 and a single Cond1 are detected, separated by 1 undefined sample, then the in-between sample and the 2 other adjacent samples must be further evaluated, because single marks and spaces are illegal in the 1,7 RLL code.

2) The above conditions are slightly modified:

Sample E is a Cond1 if: ((E>C) AND (E≧G)) OR ((E≧C) AND (E>G))

Sample D is a Cond0 if: ((D<B) AND (D≦F)) OR ((D≦B) AND (D<F))

Note that we now allow one of the two relevant neighbor samples (at distance 2) to be equal to the center one.

If 2 consecutive Cond1's are detected then those 2 channel-bits are set to '1'. Likewise, if 2 consecutive Cond0's are detected then those 2 channel-bits are set to '0'.

In the waveform shown in FIG. 5B, sample D is a single Cond0 and F is a single Cond1. This means that one of the samples C, E or G must be part of a 2T mark and one of them must be part of a 2T space. The most likely resolution is determined by the amplitude differences of (C–E) and (E–G). In this case (E–G) is much larger, which makes sample G the most likely to be correct. As it is more negative it is considered a logical zero. Note that it is also clearly below the slice level, but that information is not used here.

Since G is now chosen to be a zero, E and F are set to '1' and C and D are cleared to '0'.

So samples C through F are corrected (overruled) in case the slice level had decided incorrectly.

This is all accomplished by means of relative comparisons, independent of the slice level and independent of the absolute signal amplitude (i.e. by means of "Maximum Likelihood Detection"). However, all Cond1 samples and Cond0 samples must be within the "3T-window" to make sure that we were not dealing with noisy flats of long marks or spaces.

Looking now to the waveform of FIG. 5C, sample G has dropped below sample E, which is now the undefined sample between a single Cond0 (sample D) and a single Cond1 (sample F). Delta (C–E) is larger than delta (E–G) and since (C–E) is positive, C must be a '1'. This makes D and E a '0' and it makes F and G a '1'. Again, the preliminary decision by the slice-level is overruled.

Figure 5D:
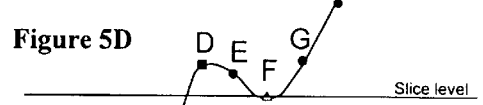
Figure 5C:
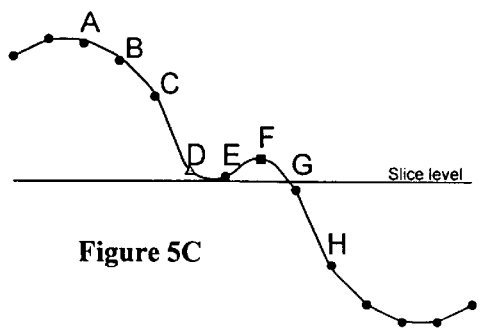

In FIG. 5D sample G has risen above sample E, which is now the undefined sample between a single Cond1 (sample D) and a single Cond0 (sample F). Delta (C–E) is larger than delta (E–G) and since (C–E) is negative, C must be a '0'. This makes D and E a '1' and it makes F and G a '0'. Again, the preliminary decision by the slice-level is overruled.

Figure 5E:

FIG. 5E shows a waveform wherein sample C has dropped below sample E, which is now the undefined sample between a single Cond1 (sample D) and a single Cond0 (sample F). Delta (C–E) is smaller than delta (E–G) and since (G–E) is positive, G must be a '1'. Hence, E and F are cleared to '0', C and D are set to '1'.

Figure 5F:
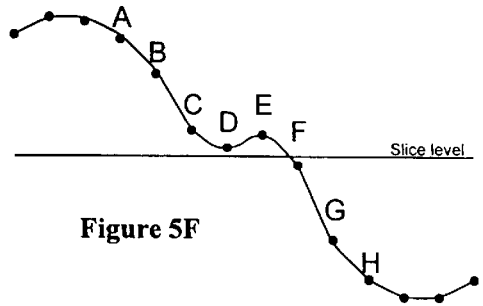

In FIG. 5F there is shown a waveform which exhibits two problems: C has risen above E and F has dropped below D. None of the level conditioning conditions is met in this case. For this special case a waveform-recognizer is required. This waveform recognizer requires:

If (BC) AND (C>D) AND (D≦E) AND (E>F) AND (F>G) AND (D within the 3T-Window) then:

C='0', D='0', E='1', F='1'.

Figure 5G:
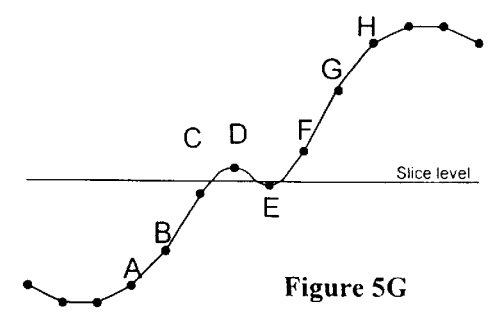

The waveform shown in FIG. 5G illustrates the inverse of that shown in FIG. 5F. For that special case we use a similar waveform-recognizer:

If (B<C) AND (C<D) AND. (D≧E) AND (E<F) AND (F<G) AND (D in 3T-Window) then:

C='1', D='1', E='0', F='0'.

Figure 5H:
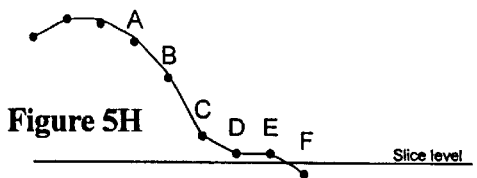

FIG. 5H illustrates a case similar to that shown in FIG. 5F. As D=E it meets the Special Case criterion, so C and D are cleared and E and F are set.

Figure 5I:
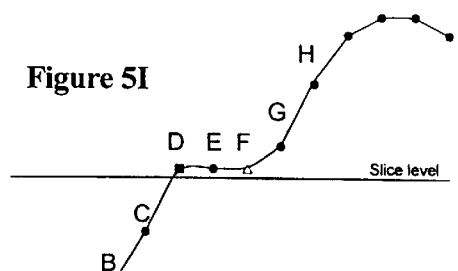

Likewise, the waveform of FIG. 5I is similar to that of FIG. 5D, except that D=F. Still D is a Cond1 because ((D>B) AND (D≧F)). Likewise F is a Cond0 because ((F≦D) AND (F<H)). So the undefined sample E is compared to C and G just like in FIG. 5D. Thus D and E are set to '1', F and G are cleared to '0'.

Figure 5J:
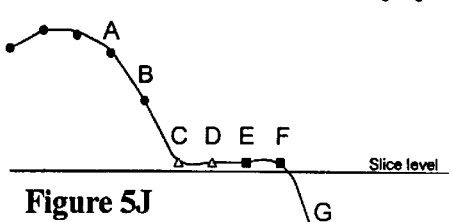

FIG. 5J is similar to FIG. 5B, except that samples C through F are all equal. Still samples C and D comply with the modified level conditioning rules (Cond0) and samples E and F comply with the modified rules (Cond1).

Figure 5K:
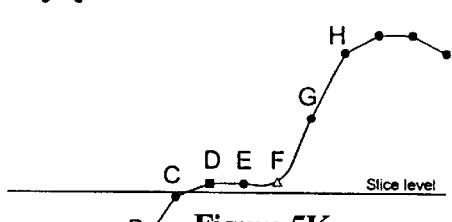

FIG. 5K is similar to FIG. 5D, except that D=F.

Figure 5L:
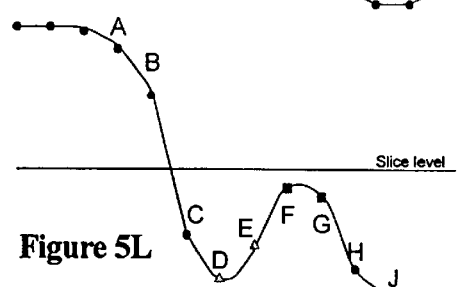

The waveform shown in FIG. 5L shows a long Mark, 3T-space, 2T-mark, Long Space. Samples C,D and E are clearly below the Slice-level, so are set to '0'. D and E are also Cond0's so they are set to 0 again. F and G are both Cond1's and thus are both set to '1'. Again, the preliminary decision by the slice-level is overruled.

Figure 5M:
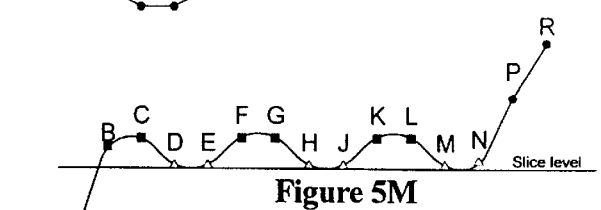

FIG. 5M shows a waveform which displays the typical case of several alternating 2T marks and spaces. All of the samples B through N are recognized by standard level conditioning and thus are decoded correctly, even though the Slice Level is not correct for these channel-bits.

Figure 5N:
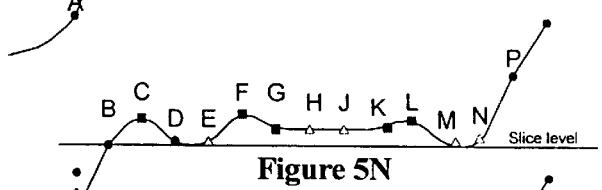

The waveform of FIG. 5N is similar to that of FIG. 5M, but it has 2 problems. First of all sample B has dropped below D, which is now the undefined sample between the single Cond1 at C and the single Cond0 at E. Delta (B–D) is smaller than delta (D–F) and since (F–D) is positive, F must be '1'. This makes D a '0' and it makes B a '1'.

Secondly, due to noise (or a small defect), samples G through K have become equal. But because of the modified level conditioning rules, G is a Cond1, H is a Cond0, J is a Cond0 and K is a Cond1. So F and G are set to '1', H and J are cleared to '0', K and L are set to '1'.

Figure 5O:
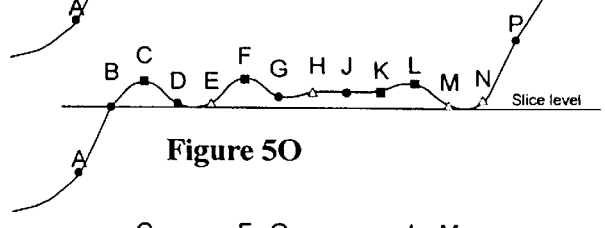

FIG. 5O is very similar to FIG. 5N, except that sample G is even lower. Because of that G has become a undefined between a single Cond1 and a single Cond0. So now it's delta from E is compared to it's delta from J. As delta (E–G) is larger, F and G are set to '1', H and J are cleared to '0' (similar to case 9).

If G would drop even lower, such that delta (G–J) becomes larger than delta (E–G), then samples E through H are set wrong, obviously resulting in a read-error.

Figure 5P:
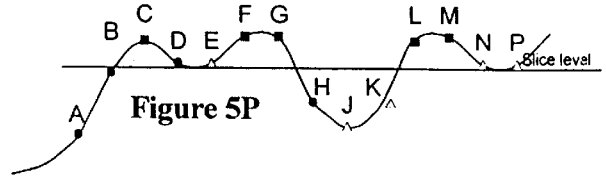

The waveform shown in FIG. 5P is similar to that of FIG. 5O, but it has a real 3T space at H, J and K (versus a defect). Sample H is undefined by the level conditioning rules, but as it is not enclosed by opposite single rule compliance conditions, it is left alone (not overruled). As sample H is part of a 3T space, the slice-level should make the correct decision.

Figure 5Q:
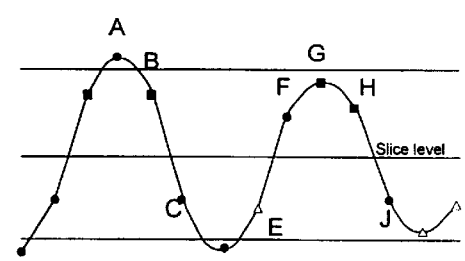

Lastly, FIG. 5Q illustrates a number of 3T Marks and 3T Spaces, the Slice-level and the 3T Top and Bottom levels. Samples A and D are undefined by the level conditioning requirements because they are outside the 3T-window, but none of the undefined samples is enclosed by opposite rule compliance conditions, so they are all defined by the Slice-level, which is correct. Level conditioning and rule compliance principles are only supposed to make corrections for 2T marks and spaces.

In all these cases with undefined samples between single level conditioned samples, the amplitude deltas between the relevant samples is significant, indicating that rule compliance offers good margins for these worst case waveforms.

Figure 6A:
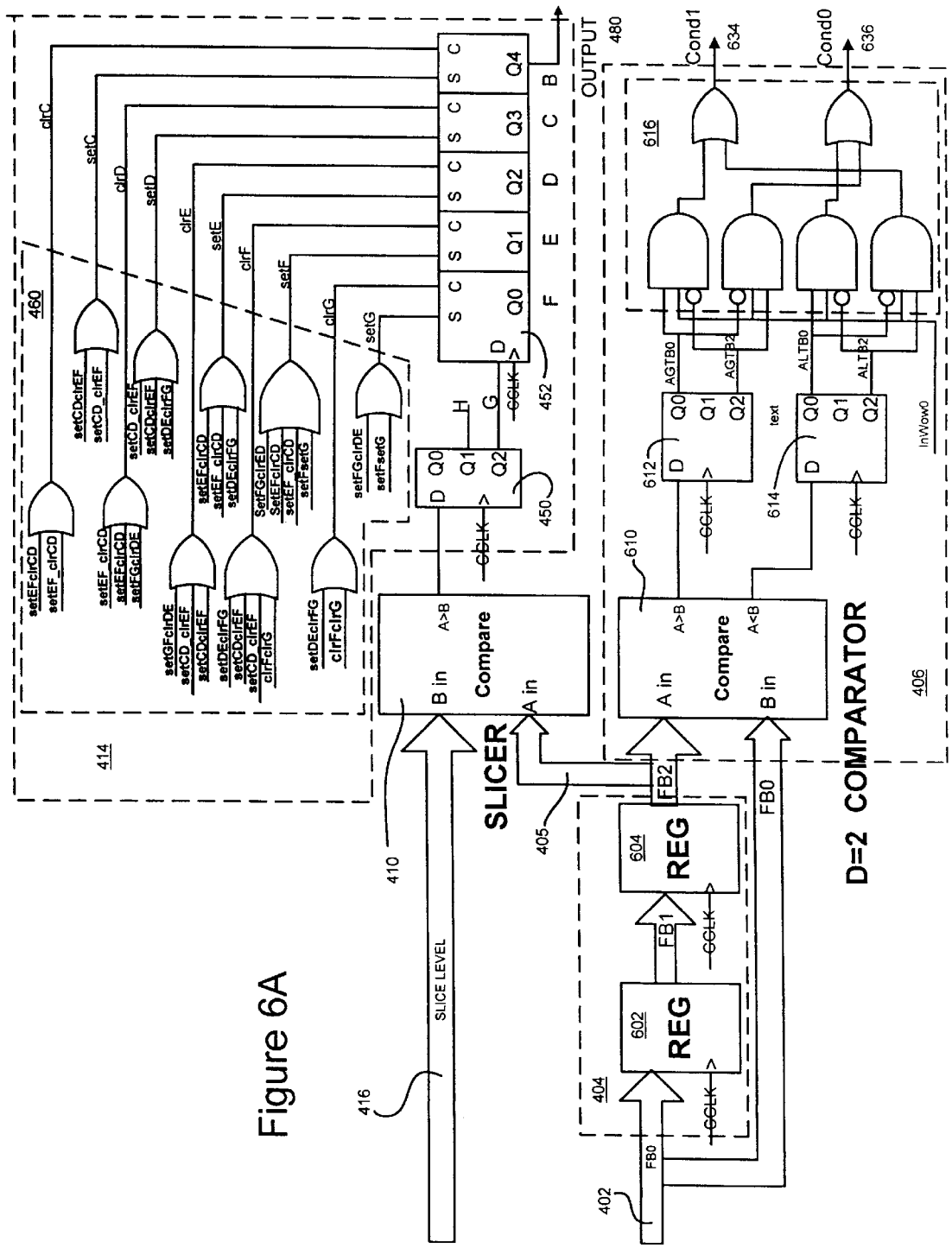
FIG. 6A–6C are a series of block diagrams of the circuitry utilized in one embodiment of the invention to implement the enhanced adaptive and selective ISI cancellation methodologies of the present invention.
Figure 6B:
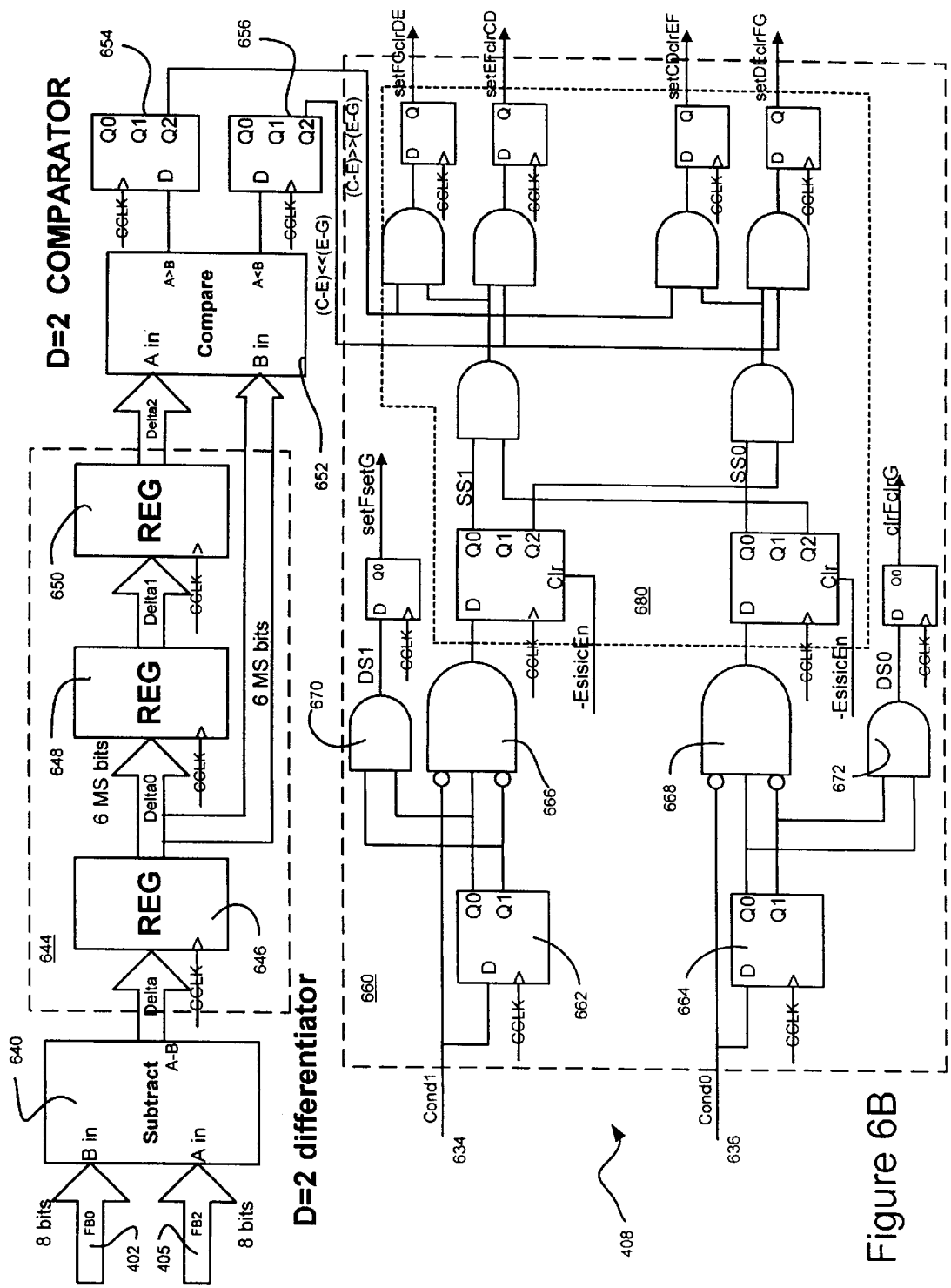
Figure 6C:
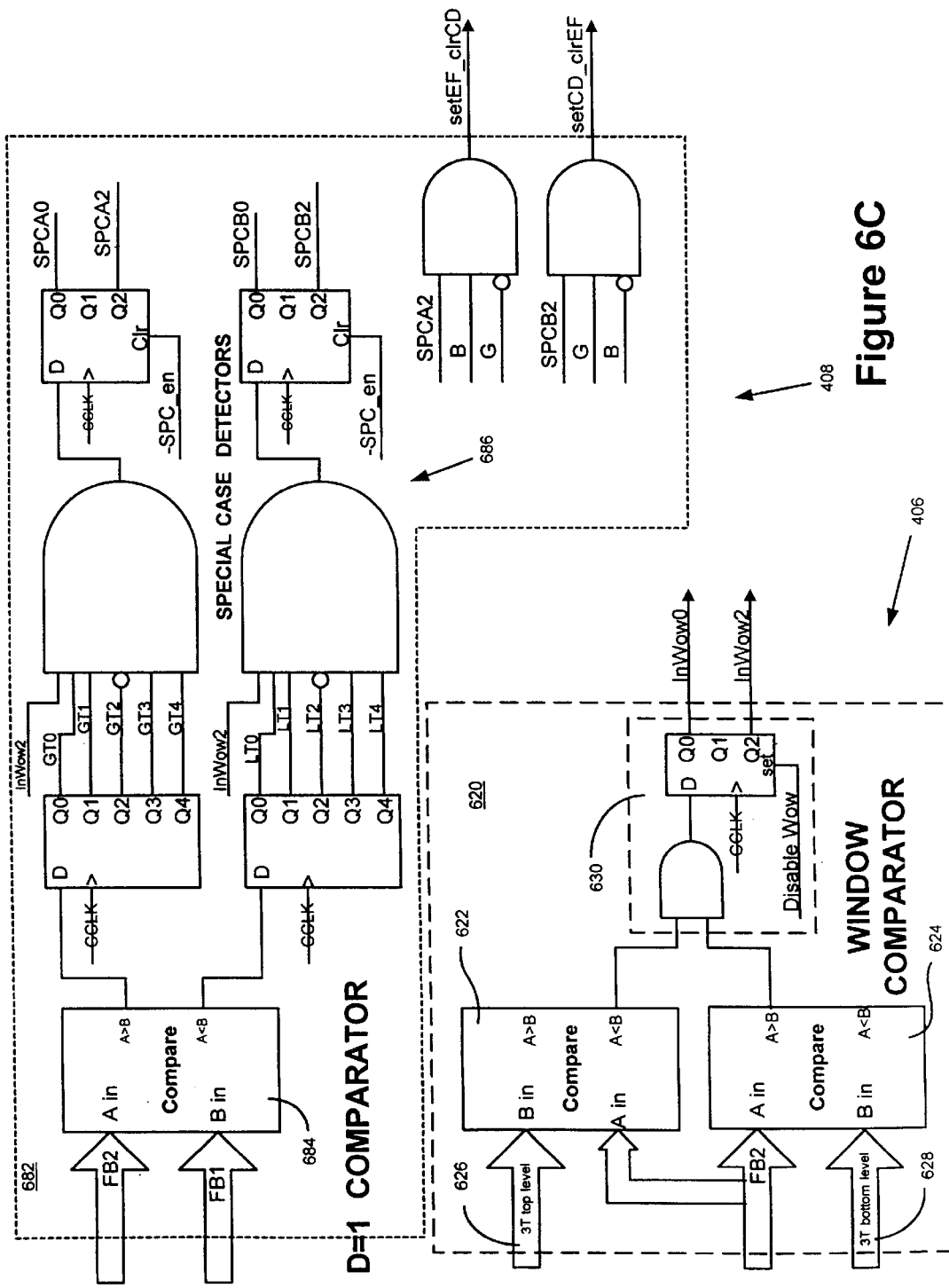

Referring now to FIGS. 6A through 6C, there is shown a more detailed block diagram of ISI cancellation system 400.

Referring specifically to FIG. 6A, it can be seen that read signal 402 is provided to both an input of delay circuit 404 and level conditioning circuit 406. Delay circuit 404 includes a first register 602, and a second register 604, both of which implement one channel bit period time delays. Consequently, the output FB2 from delay 404 trails the input FB0 by two channel bits. Internally, the output from first register 602 (FB1) will trail the input (FB0) by one channel bit.

These two channel bit signals are then provided to level conditioning circuit 406. Level conditioning circuit 406 includes a comparator 610, a first delay circuit 612, a second delay circuit 614, and conditioning logic 616. Conditioning logic 616 is capable of providing the initial level conditioning analysis to determine the appropriate relationships between a main channel bit and its two neighbor channel bits. If the appropriate level conditioning conditions are met (as outlined above), conditioning logic 616 will provide an output indicating that the main channel bit should be designated as a "Condition One" (Cond1) or a "Condition Zero" (Cond0).

Once again, level conditioning will. only be undertaken when the subject channel bit is within the 3T window. Consequently, level conditioning circuit 406 includes a window comparator 620 as shown in FIG. 6C. Window comparator 620 receives the delay circuit output 405 (FB2) as an input thereto. Delay circuit output 405 is then provided at a first input to both first comparator 622 and second comparator 624. Also included as input to first comparator 622 is a 3T top level signal 626. This 3T top level signal is indicative of the predetermined 3T signal amplitude. Similarly, comparator 624 receives a 3T bottom level signal 628 at its second input. First comparator 622 and second comparator 624 then provide inputs to comparison logic 630. Comparison logic 630 can then produce an output signal InWow0, indicating that the subject channel bit (FB2) is either within or outside the 3T window. As can be seen by referring to FIG. 6A, this signal is then provided to conditioning logic 616. As expected, conditioning. logic 616 will not produce any output if the subject channel bit is not within the 3T window.

Level conditioning circuit 406 has two outputs, Cond1 634 and Cond0 636. These outputs provide an indication if the subject channel bit is designated as a "Condition One" (Cond1) or a "Condition Zero" (Cond0). Alternatively, signals can indicate whether no conditioning is appropriate. First level conditioning output 634 and second level conditioning 636 are then provided to the rule compliance circuit 408, which is shown in more detail on FIGS. 6B and 6C.

Referring specifically now to FIG. 6B, it can be seen that read signal input 402 and delay circuit output 405 are both provided to the input of a differentiator 640. Differentiator 640 is then capable of determining the relative amplitude difference between the subject channel bit FB2 and neighbor channel bit FB0. The output from differentiator is then provided to a delay network 644 which includes a first register 646, a second register 648, and a third register 650. These registers will all appropriately produce delays in order to provide a difference comparator 652 with appropriate values. More specifically, difference comparator 652 will receive signals indicating the relative difference between the subject channel bit and its two appropriate neighbor channel bits. The output from difference comparator 652 then can indicate which pair of channel bits (either subject channel bit and first neighbor or subject channel bit and second neighbor) has a larger relative difference. This output is then provided to a pair of delay circuits 654 and 656 which provide appropriate timing delays and subsequently output an indication of the relative values.

As previously mentioned, first conditioning logic output 634 and second conditioning logic output 636 are provided to rule compliance circuitry 408. Specifically, these signals are provided to rule compliance logic 660 in order to determine if a single undefined sample exists between a pair of conditioned channel bits, thus indicating that the data pattern is not in compliance with the subject data coding. Rule compliance logic 660 includes first delay circuit 662, second delay circuit 664, first single point determination logic 666 and second single point determination logic 668. If a single condition one or a single condition zero is found to exist, appropriate signals are produced at the output of single point determination logic 666 or second single point determination logic 668. This then will enable further comparisons in order to address the undefined channel bit. Alternatively, if two consecutive condition ones or two consecutive condition zeros are found to exist, define set one logic 670 and define set zero logic 672, which will produce appropriate signals to transmit to overrule control 414.

Once a single Condition Zero or a single Condition One is found to exist, rule compliance logic 680, in conjunction with the outputs from difference comparator 652 applies the above-outlined rules to determine the appropriate logic level for the unidentified channel bit. Once again, appropriate outputs are then provided to overrule circuit 414.

As further outlined above, certain circumstances exist where special case detectors are required. Referring specifically to 6C, a more detailed block diagram of a special case detector 682 is shown. Special case detector 682 includes a special case comparator 684 which is capable of comparing the relative value of adjacent channel bits. As can be seen, this special case comparator 684 receives an intermediate input FB1 from delay circuit 404. Consequently, the two inputs to special case comparator 684 are adjacent channel bits which can then be examined. Special case logic 686 is included in this special case detector 682 which compares the relative values of the numerous adjacent channel bits. Applying the rules outlined above, the special case comparator can then produce outputs to overrule circuitry 414 to appropriately set or clear any necessary bits.

Referring again to FIG. 5A, detection circuit 410 includes an input from a delay circuit 404 and a slice level input 416. These various inputs are utilized to produce a bit slice output for the subject data bit. This output is then provided to overrule circuitry 414 which includes inputs from rule compliance circuit 408 as well. As can be seen, overrule circuitry 414 includes a timing delay 450 and a shift register 452. Shift register 452 includes numerous control inputs from overrule control logic 460 in order to appropriately set or reset the various channel bits being analyzed. Ultimately, the channel bit logical polarity will be output from overrule logic 414 at output 480.

As can be seen, overrule logic 460 includes a number of OR gates, all of which receive inputs from rule compliance circuitry 408. Each of these inputs is capable of setting or clearing a particular channel bit based upon either the above described level conditioning rules or the above described rule compliance rules.

Conclusion

The present invention provides systems, methods and apparatus for recovering data from recording media, including, for example, magnetic disk, optical disk, optical tape, and magneto-optical systems. An example advantage of embodiments of the present invention is that it enables provision of accurate detection of recorded data while accommodating increased recording density and other parameters that tend to cause the threshold to vary and margins to degrade.

It will be understood that various other changes in the details, materials, and arrangements of the parts and steps which have been described and illustrated in order to explain the nature of this invention ma be made by those skilled in the art without departing from the principles and scope of the invention as expressed in the subjoined Claims.

What is claimed is:

1. A method for insuring the accuracy of read data stored using a predetermined data storing protocol, the method comprising reading a predetermined data-pattern so as to defining an upper qualification level and a lower qualification level;

reading a primary data value from the read data;

comparing an amplitude value for the primary data value with the upper qualification level and a lower qualification level; and analyzing the amplitude value corresponding to the primary data value for compliance with the predetermined data storing protocol if the amplitude value for the primary data value is less than the upper qualification level and greater than the lower qualification level.

2. The method of claim 1 wherein the predetermined data storing protocol is 1,7 RLL data coding and the predetermined data-pattern includes a 3T mark and a 3T space.

3. The method of claim 2 wherein the upper qualification level is equal to the peak amplitude for the 3T mark and the lower qualification level is equal to the peak amplitude for the 3T space.

4. The method of claim 2 wherein the upper qualification level is equal to the shoulder amplitude for the 3T mark and the lower qualification level is equal to the shoulder amplitude for the 3T space.

5. The method of claim 1 wherein the step of analyzing includes:

comparing the amplitude of the primary data value with a first neighbor value two channel bits ahead of the primary data value and a second neighbor value two channel bits behind the primary data value;

reading a second primary data value from the read data, the second primary data value being one channel bit behind the primary data value;

comparing the amplitude of the second primary data value with a first neighbor value two channel bits ahead of the second primary data value and a second neighbor value two channel bits behind the second primary data value; and conditioning the primary data value and the second primary data value if a predetermined relationship exists between their neighbors.

6. The method of claim 5 wherein the predetermined relationship includes both the primary data value and the second primary data value being greater than their respective first neighbor and second neighbor values.

7. The method of claim 5 wherein the predetermined relationship includes both the primary data value and the second primary data value being less than their respective first neighbor and second neighbor values.

8. The method of claim 1 wherein the step of analyzing includes comparing the amplitude of the primary data value with a first neighbor value two channel bits ahead of the primary data value and a second neighbor value two channel bits behind the primary data value.

9. The method of claim 8 further comprising designating the primary data value as a conditioned "1" or a conditioned "0" or an non-designated value depending on it's relationship with the first neighbor value and the second neighbor value.

10. The method of claim 9 wherein the primary data value is a non-designated value and is surrounded by a first adjacent data value being a conditioned "0" and a second adjacent data value being a conditioned "1", the method comprising:

compute a first amplitude difference between the primary data value and the first neighbor;

compute a second amplitude difference between the primary data value and the second neighbor;

compare the first amplitude difference and the second amplitude difference to which has a larger magnitude, and designate the first neighbor the winner if the first amplitude difference is larger or designate the second neighbor as the winner if the second amplitude difference is larger, and designate as the looser the neighbor with the smaller amplitude difference;

designate the winner a conditioned "1" if its amplitude value is greater than the primary data value or a conditioned "0" if its amplitude value is less than the primary data value;

designate the primary data value to a logical value opposite that of the designation of the winner; and designate the loser to a logical value opposite that of the recently designated primary data value.

11. The method of claim 10 further comprising redesignating the two designated values surrounding the primary data value such that the previously designated value between the winner and the primary data value is redesignated to be equal to the primary data value while the previously designated value between the loser and the primary data value is redesignated to be opposite the primary data value.

12. The method of claim 10 wherein the first neighbor and the second neighbor have values between the upper qualification level and the lower qualification level.

13. The method of claim 1 wherein the analyzing of the primary data value, designated as $S_k$, comprises a comparison with a first preceding data value, designated as $S_{k-3}$, a second preceding data value, designated as $S_{k-2}$, a third preceding data value, designated as $S_{k-1}$, a first subsequent data value, designated as $S_{k+1}$, and a second subsequent data value, designated as $S_{k+2}$, and, if the data values are such that $S_{k-3} > S_{k-2} > S_{k-1} \leq S_k > S_{k+1} > S_{k+2}$, then assigning the data value such that $S_{k-2}$ is a logical zero, $S_{k-1}$ is a logical zero, $S_k$ is a logical one, and $S_{k+1}$ is a logical one.

14. The method of claim 1 wherein the analyzing of the primary data value, designated as $S_k$, comprises a comparison with a first preceding data value, designated as $S_{k-3}$, a second preceding data value, designated as $S_{k-2}$, a third preceding data value, designated as $S_{k-1}$, a first subsequent data value, designated as $S_{k+1}$, and a second subsequent data value, designated as $S_{k+2}$, and, if the data values are such that $S_{k-3} < S_{k-2} < S_{k-1} \geq S_k < S_{k+1} < S_{k+2}$, then assigning data value such that $S_{k-2}$ is a logical one, $S_{k-1}$ is a logical one, $S_k$ is a logical zero, and $S_{k+1}$ is a logical zero.

15. A system for accurately reading data which is prone to inter-symbol interference, comprising:

a readout for interacting with a recording media and producing a raw data signal indicative of the information on the recording media;

a data slicing circuit attached to the readout for comparing the raw data signal with a set level, and assigning a rough logical value base on the comparison;

a level conditioning circuit attached to the readout for producing an initial assessment as to a conditioned logical value of data in the raw data signal;

a rule compliance circuit attached to the level conditioning circuit and the readout for evaluating the raw data signal and the initial assessment to determine compliance with a data protocol being used, and producing an overrule signal indicating that the rough logical value should be overruled; and an overrule circuit attached to the compliance circuit and the data slicing circuit for producing an output, the output being equal to the rough logical value or an overruled value depending upon the status of the overrule signal.

16. The system of claim 15 wherein the data protocol is 1,7 RLL data coding.

17. The system of claim 15 wherein the overrule value has a logical value opposite the rough logical value.

18. An ISI cancellation system for receiving data from a readout system which reads data stored on a storage media which includes a predetermined data pattern, the ISI cancellation system insuring the accuracy of read data stored using a predetermined data storing protocol, the system comprising a pattern analyzing circuit for receiving the readout signal indicative of the predetermined data pattern and defining an upper qualification level and a lower qualification level based on the predetermined data pattern;

a conditioning circuit for comparing an amplitude value for a primary data value with the upper qualification level and a lower qualification level and producing a conditioned value for the primary data value; and a compliance circuit for analyzing the primary data value for compliance with the predetermined data storing protocol if the amplitude value for the primary data value is less than the upper qualification level and greater than the lower qualification level.

19. The system of claim 18 wherein the predetermined data storing protocol is 1,7 RLL data coding and the predetermined data-pattern includes a 3T mark and a 3T space.

20. The system of claim 19 wherein the upper qualification level is equal to the peak amplitude for the 3T mark and the lower qualification level is equal to the peak amplitude for the 3T space.

21. The system of claim 19 wherein the upper qualification level is equal to the shoulder amplitude for the 3T mark and the lower qualification level is equal to the shoulder amplitude for the 3T space.

22. The system of claim 18 wherein the compliance circuit analyzes the primary data value by comparing the amplitude of the primary data value with a first neighbor value two channel bits ahead of the primary data value and a second neighbor value two channel bits behind the primary data value, and by reading a second primary data value from the read data, the second primary data value being one channel bit behind the primary data value and comparing the amplitude of the second primary data value with a first neighbor value two channel bits ahead of the second primary data value and a second neighbor value two channel bits behind the second primary data value, the circuit then conditioning the primary data value and the second primary data value if a predetermined relationship exists between their neighbors.

23. The system of claim 22 wherein the predetermined relationship includes both the primary data value and the second primary data value being greater than their respective first neighbor and second neighbor values.

24. The system of claim 22 wherein the predetermined relationship includes both the primary data value and the second primary data value being less than their respective first neighbor and second neighbor values.

25. The system of claim 18 wherein the compliance circuit analyzes by comparing the amplitude of the primary data value with a first neighbor value two channel bits ahead of the primary data value and a second neighbor value two channel bits behind the primary data value.

26. The system of claim 18 wherein the compliance circuit further analyzes the primary data value when it is surrounded by a pair of designated data values having logical polarity opposite the primary data value, the analysis involving first computing a first amplitude difference between the primary data value and the first neighbor and computing a second amplitude difference between the primary data value and the second neighbor, the compliance circuit then comparing the first amplitude difference and the second amplitude difference to determine which has a larger magnitude, and designate the first neighbor the winner if the first if the first amplitude difference is larger or designate the second neighbor as the winner if the second amplitude difference is larger, and designate as the looser the neighbor with the smaller amplitude difference, the system then designating the winner a conditioned "1" if its amplitude value is greater than the primary data value or a conditioned "0" if its amplitude value is less than the primary data value, and designating the primary data value to a logical value opposite that of the designation of the winner and designating the loser to a logical value opposite that of the recently designated primary data value.

27. The system of claim 26 wherein the compliance circuit further designates the two designated values surrounding the primary data value such that the previously designated value between the winner and the primary data value is redesignated to be equal to the primary data value while the previously designated value between the loser and the primary data value is redesignated to be opposite the primary data value.

28. The system of claim 18 wherein the analyzing of the primary data value by the compliance circuit, designated as $S_k$, comprises a comparison with a first preceding data value, designated as $S_{k-3}$, a second preceding data value, designated as $S_{k-2}$, a third preceding data value, designated as $S_{k-1}$, a first subsequent data value, designated as $S_{k+1}$, and a second subsequent data value, designated as $S_{k+2}$, and, if the data values are such that $S_{k-3} > S_{k-2} > S_{k-1} \leq S_k > S_{k+1} > S_{k+2}$, then assigning the data value such that $S_{k-2}$ is a logical zero, $S_{k-1}$ is a logical zero, $S_k$ is a logical one, and $S_{k+1}$ is a logical one.

29. The system of claim 18 wherein the analyzing of the primary data value by the compliance circuit, designated as $S_k$, comprises a comparison with a first preceding data value, designated as $S_{k-3}$, a second preceding data value, designated as $S_{k-2}$, a third preceding data value, designated as $S_{k-1}$, a first subsequent data value, designated as $S_{k+1}$, and a second subsequent data value, designated as $S_{k+2}$, and, if the data values are such that $S_{k-3 <S_{k-2}} < S_{k-1} \geq S_k < S_{k+1} < S_{k+2}$, then assigning the data value such that $S_{k-2}$ is a logical one, $S_{k-1}$ is a logical one, $S_k$ is a logical zero, and $S_{k+1}$ is a logical zero.

* * * * *

UNITED STATES PATENT AND TRADEMARK OFFICE
CERTIFICATE OF CORRECTION

PATENT NO.   : 6,407,970 B2
DATED        : June 18, 2002
INVENTOR(S)  : Johannes J. Verboom It is certified that error appears in the above-identified patent and that said Letters Patent is hereby corrected as shown below:

Column 15,
Line 58, delete "BC" and insert -- B>C --
Line 64, delete "." after the word "AND"

Column 17,
Line 22, delete "." after the word "will"
Line 39, delete "." after the word "conditioning"

Column 19,
Line 8, delete "ma" and insert -- may --

Column 20,
Line 20, delete "looser" and insert -- loser --

Column 22,
Line 24, delete "if the first" after the word "first"
Line 26, delete "looser" and insert -- loser --

Signed and Sealed this

Twenty-sixth Day of November, 2002

*Attest:*

JAMES E. ROGAN
*Attesting Officer*   *Director of the United States Patent and Trademark Office*